United States Patent [19]

Okada et al.

[11] 4,065,517
[45] Dec. 27, 1977

[54] FLAME RETARDANT POLYSULFONE COMPOSITION

[75] Inventors: Naotake Okada; Takeshi Iwabuchi, both of Ichihara, Japan

[73] Assignee: Nissan Chemical Industries Ltd., Tokyo, Japan

[21] Appl. No.: 676,870

[22] Filed: Apr. 14, 1976

[51] Int. Cl.² ............................................. C08K 5/53
[52] U.S. Cl. ........................... 260/823; 260/45.7 P; 260/47 P; 260/49
[58] Field of Search ................. 260/45.75 B, 45.7 P, 260/823, 47 P, 49

[56] References Cited

U.S. PATENT DOCUMENTS

| | | | |
|---|---|---|---|
| 2,572,076 | 10/1951 | Toy | 260/47 P |
| 2,682,522 | 6/1954 | Coover et al. | 260/47 P |
| 3,875,236 | 4/1975 | Little et al. | 260/45.7 R |
| 3,932,351 | 1/1976 | King | 260/45.7 P |

OTHER PUBLICATIONS

New Linear Polymers, by Henry Lee et al., 1967, pp. 102 to 127.

*Primary Examiner*—V. P. Hoke
*Attorney, Agent, or Firm*—Oblon, Fisher, Spivak, McClelland & Maier

[57] ABSTRACT

A polysulfone composition comprises 1 to 20 wt. % of polyphosphonate having the formula

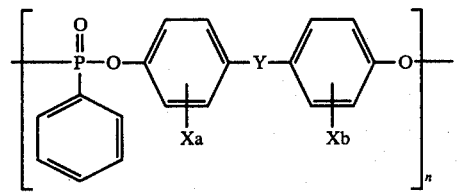

wherein X represents Br or Cl; Y represents a $C_{1-8}$ alkylidene group or sulfone group; $a$ and $b$ are respectively integers of 1 to 4 and $n$ is an integer of 2 to 100.

3 Claims, No Drawings

FLAME RETARDANT POLYSULFONE COMPOSITION

BACKGROUND OF THE INVENTION

The present invention relates to a flameproof resin composition comprising polysulfone (polyarylenepolyether polysulfone) and polyphosphonate.

The polysulfones have high heat resistance and excellent mechanical properties and electrical properties. Accordingly, they have been used for various construction materials as the engineering plastics. The polysulfones are self-extinguish resins. However, high flameproof property has been required for the polysulfone used as electrical parts from the viewpoints of safety.

In order to improve flameproof property of polysulfones, it has been known to produce the chlorine-containing polysulfones by adding hexachlorobenzene and tetrachlorobenzene (Bel. P. No. 737,530) or tetrachlorobiphenyl ether (G.P. No. 1,919,677) as a comonomer in the preparation of polysulfones.

In said cases, the polymerization volocity has been decreased or the average molecular weight of the product has been decreased, disadvantageously.

It has been known that an aromatic bromo compound such as hexabromobenzene or decabromobiphenyl and antimony trioxide are added to the polysulfone to impart flameproof property.

In said case, the mechanical properties have been decreased by adding relatively small amount of the aromatic bromo compound and antimony trioxide. The aromatic bromo compound is vaporized in the molding work to cause an air pollution of work environment.

It is hard to add haloalkyl phosphates because haloalkyl phosphates have low heat resistance to cause a decomposition of polysulfones in the molding operation.

SUMMARY OF THE INVENTION

It is an object of the present invention to provide a polysulfone composition which has no vaporization of a component in a molding operation and has an improved flameproof property without deterioration of mechanical properties and electrical property of polysulfone and has high durability by using for a long time.

The object of the invention has been attained by providing a polysulfone composition which comprises 1 to 20 wt.% of polyphosphonate having the formula

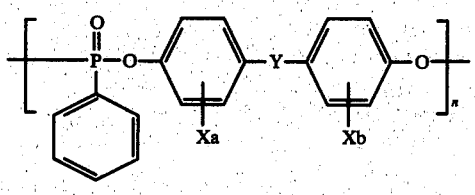
(I)

wherein X represents Br or Cl; Y represents a $C_{1-8}$ alkylidene group or sulfone group; $a$ and $b$ are respectively integers of 1 to 4 and $n$ is an integer of 2 to 100.

DETAILED DESCRIPTION OF THE EMBODIMENTS

The polyphosphonates used in the invention can be produced by reacting phenylphosphonic dichloride with a halogenated aromatic diol corresponding to the polyphosphonate (I), in an inert solvent such as 1,1,2,2-tetrachloroethane, nitrobenzene, tetrahydrofuran, etc. in the presence of a catalyst of calcium chloride, magnesium chloride, etc. to result a polycondensation under a dehydrochloric acid, or in the presence of a hydrochloric acid removing agent such as a tert-amine e.g. triethylamine.

It is also possible to produce the polyphosphonates (I) by a polycondensation in a melting state without a solvent or by a surface polycondensation by contacting an alkaline aqueous solution of a halogenated aromatic diol with an organic solvent sulution of phenylphosphonic dichloride. Typical halogenated aromatic diols corresponding to the polyphosphonates (I) include 2,2-bis (3,5-dibromo-4-hydroxyphenyl) propane, 2,2-bis(3,5-dichloro-4-hydroxyphenyl) propane, 3,3',5,5'-tetrabromo-4,4'-dihydroxydiphenylsulfone, bis(2-bromo-4-hydroxyphenyl) methane, bis (2,6-dibromo-4-hydroxyphenyl) methane, 1,1-bis (3,5-dibromo-4-hydroxy phenyl) ethane, 2,2-bis (2,6-dichloro-4-hydroxyphenyl) pentane, 2,2-bis (4-hydroxy-2,3,5,6-tetrabromophenyl) propane, 2,2-bis (4-hydroxy-2,3,5,6-tetrachlorophenyl) propane and the like.

It is possible to combine two or more diols. It is also possible to use less than 50 wt.% of aromatic diol having no halogen atom. instead of the halogenated aromatic diol.

The polyphosphonates used in the invention have good miscibility to the polysulfones, and can be blended as desired.

When the amount of the polyphosphonate is more than 25 wt. parts per 100 wt. parts of the polysulfone, the mechanical properties are decreased. When the amount of the polyphosphonate is less than 1 wt. part per 100 wt. parts of the polysulfone, the improvement of flameproof property is not found. It is possible to improve flameproof property by combining antimony trioxide as an accelerator.

It is considered that high flameproof property can be imparted by adding a small amount of the polyphosphonate because of synergical effect of phosphorus and a halogene.

The polysulfones used in the invention have the following unit formula

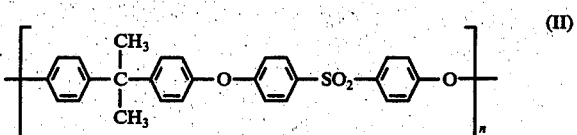
(II)

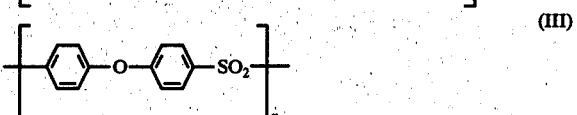
(III)

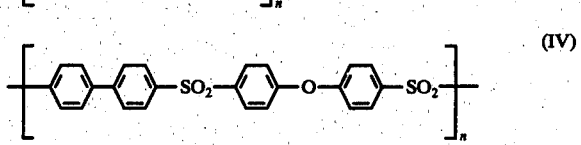
(IV)

wherein $n$ represents a polymerization degree of an integer of 10 to 200.

The polyphosphonate can be blended with the polysulfone by meltblending with a two roll-mill or an extruder. The polyphosphonate has high miscibility to the polysulfone and has similar melting point. Accordingly they are easily blended and no bread out is found and no vaporization is found after blending them.

Moreover, no coloring is found whereby the polysulfone composition can be obtained without deterioration of transparency of the polysulfone which is one of advantageous characteristics.

The polyphosphonates are polymers whereby the mechanical properties of the polysulfone is not deteriorated by blending the polyphosphonate.

This is one of the advantageous characteristics.

The excellent electrical properties of the polysulfone can be maintained by blending the polyphosphonate.

The invention will be further illustrated by certain examples.

The evalutation of flameproof property was conducted by the oxygen index method stated in ASTM D-2863-70.

The tensile strength was measured by ASTM D-638.

The dielectric loss tangent and the dielectric constant were measured by ASTM D-150.

EXAMPLE 1

A. Preparation of polyphosphonate:

In a 500 ml four necked flask equipped with a stirrer, a thermometer and a dropping funnel, 250 ml of chloroform, 54.4 g of 2,2-bis (3,5-dibromo-4-hydroxyphenyl) propane and 24.2 g of triethylamine were charged.

A mixture of 50 ml of chloroform and 19.5 g of phenylphosphonic dichloride was added dropwise to the mixture in the flask with stirring under cooling with ice. The reaction was conducted at 50° C for 2 hours and then the reaction mixture was cooled and was added dropwise to 3 liter of methanol to form a precipitate. The precipitate was washed with methanol and dried to obtain the polyphosphonate (A) having the following formula

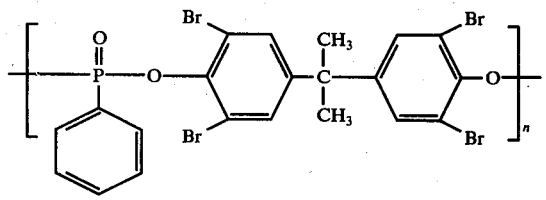

at a yield of 91%.

Accordingly to the capillary method, the melting point of the polyphosphonate (A) was 228 to 232° C.

The viscosity [η] of the polyposphonate in a mixture of 3 : 2 of phenol to 1,1,2,2,-tetrachloroethane at 30° C was 0.276.

B. Preparation of polysulfone composition:
The polysulfone having the formula

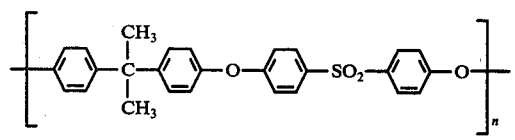

(n = 65)

was crushed and dried at 120° C for 6 hours under a reduced pressure. The polyphosphonate (A) produced in the step A was admixed with the polysulfone at each ratio stated in Table 1. Each mixture was kneaded at 270° to 280° C for 5 minutes with a roll mill to obtain polysulfone compositions (1) and (2).

C. Tests of flameproof property and physical properties:

The polysulfone compositions (1) and (2) and the polysulfone (no polyphosphonate) were respectively used to prepare each sheet by a press-molding machine.

The sheet was cooled and each test sample was cut from the molded sheet.

According to the above-mentioned test methods using the test samples, the oxygen index, the tensile strength, the elongation, the dielectric loss tangent and the dielectric constant were measured.

The results are shown in Table 1.

Table 1

| Composition No. | — | (1) | (2) | (3) | (4) |
|---|---|---|---|---|---|
| Polyphosphonate | | | | | |
| Type | — | (A) | (A) | (B) | (B) |
| Amount (wt.%) | 0 | 8 | 15 | 8 | 15 |
| Oxygen index | 30.0 | 40.0 | 45.0 | 35.5 | 41.0 |
| Tensile strength | 748 | 753 | 686 | 730 | 658 |
| (Kg/cm²) | 748 | 753 | 686 | 730 | 658 |
| Elongation in yield (%) | 5.9 | 6.0 | 4.8 — | — | — |
| Dielectric loss tangent 25° C 10³ cps | 0.0008 | 0.0006 | 0.0013 | — | — |
| Dielectric constant 25° C 10³ cps | 2.97 | 3.01 | 3.01 | — | — |

The polysulfone composition containing polyphosphonate (A) had higher oxygen index and higher flameproof property than those of the polysulfone.

The tensile strength, the dielectric loss tangent and the dielectric constant were substantially same and no coloring and no transparency change were found.

EXAMPLE 2

A. Preparation of polyphosphonate:

In accordance with the process of Example 1 except using phenylphosphonic dichloride and 3,3',5,5'-tetrabromo-4,4'-dihydroxydiphenylsulfone, the reaction was conducted to obtain the polyphosphonate (B) having the formula

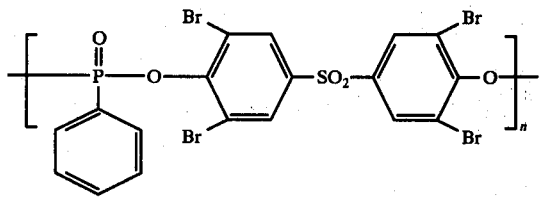

at a yield of 80%.

The polyphosphonate had a melting point of 150° to 155° C and [η] of 0.05 dl/g.

B. Preparation of polysulfone composition:

In accordance with the process of Example 1 except using the polyphosphonate (B), the polysulfone compositions (3) and (4) having the ratio stated in Table 1 were prepared.

C. Tests of flameproof property and physical properties:

In accordance with the process of Example 1 (C) except using the polysulfone compositions (3) and (4), each test sample was prepared and the flameproof property and the physical properties were tested.

The results are shown in Table 1. The polysulfone compositions having high strength and improved flameproof property were obtained by the addition of the polyphosphonate (B).

EXAMPLE 3

In a 500 ml five necked flask equipped with a stirrer, a thermometer, a dropping funnel and a condenser, phenylphosphonic dichloride, 2,2-bis (3,5-dibromo-4-hydroxyphenyl) propane and 4,4'-dihydroxydiphenylsulfone at a molar ratio of 1 : 0.5 : 0.5 were charged. Tetrachloroethane as a solvent and magnesium chloride as a catalyst were added to the mixture and a polycondensation was conducted under removing hydrochloric acid and the raction product was cooled and the polyphosphonate (C) having a melting point of 176° to 180° C and [$\eta$] of 0.28 dl/g was obtained in accordance with the process of Example 1. The polysulfone composition comprising 8 wt. % of the polyphosphonate (C) to the polysulfone of Example 1 was prepared in accordance with the process of Example 1(B).

In accordance with the process of Example 1 (C) except using the polysulfone composition, the flameproof property and the physical properties were tested.

As the result, the polysulfone composition had an oxygen index of 39.5 and a tensile strength of 760 Kg/cm² which are enough strength and flameproof property.

We claim:

1. A polyphosphonate-polyarylenepolyether polysulfone composition which comprises:

1 to 20 wt.% of a polyphosphonate having the formula:

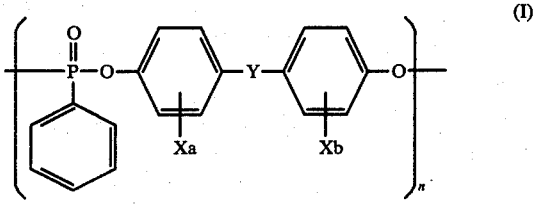

wherein X represents Br or Cl; Y represents a $C_{1-8}$ alkylidene group or sulfone group; $a$ and $b$ are respectively integers of 1 to 4 and $n$ is an integer of 2 to 100; and a polyarylenepolyether polysulfone of the formula:

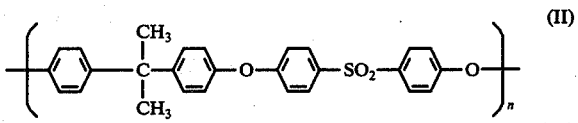

or

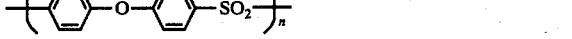

wherein $n$ is an integer of 10 to 200; or a mixture thereof.

2. The composition of claim 1 wherein the polyphosphonate is a polycondensation product of phenylphosphonic dichloride with a halogenated aromatic diol or a mixture thereof.

3. The composition of claim 2 wherein the halogenated aromatic diol is selected from the group consisting of 2,2-bis (3,5-dibromo-4-hydroxyphenyl) propane; 2,2-bis (3,5-dichloro-4-hydroxyphenyl) propane, 3,3',5,5'-tetrabromo-4,4'-dihydroxydiphenylsulfone, bis (2-bromo-4-hydroxyphenyl) methane, bis (2,6-dibromo-4-hydroxyphenyl) methane, 1,1-bis (3,5-dibromo-4-hydroxyphenyl) ethane, 2,2-bis (2,6-dichloro-4-hydroxyphenyl) pentane, 2,2-bis (4-hydroxy-2,3,5,6-tetrabromophenyl) propane and 2,2 -bis (4-hydroxy-2,3,5,6-tetrachlorophenyl) propane.

* * * * *